United States Patent [19]

Gerhart

[11] Patent Number: 5,387,986
[45] Date of Patent: Feb. 7, 1995

[54] INTEGRATED EDIT BOARD AND DOCUMENT SCANNER

[75] Inventor: Rodney E. Gerhart, Sunol, Calif.

[73] Assignees: Ricoh Company Ltd., Tokyo, Japan; Rocoh Corporation, San Jose, Calif.

[21] Appl. No.: 126,975

[22] Filed: Sep. 24, 1993

[51] Int. Cl.6 .................. H04N 1/10; H04N 1/387
[52] U.S. Cl. .................. 358/452; 358/453; 358/488; 358/497
[58] Field of Search ............. 358/452, 453, 488, 449, 358/497; 355/218, 230, 231, 235

[56] References Cited

U.S. PATENT DOCUMENTS

| | | |
|---|---|---|
| 3,251,055 | 5/1966 | McIntosh, Jr. et al. . |
| 3,859,632 | 1/1975 | Etter . |
| 3,878,559 | 4/1975 | Pugsley . |
| 4,233,636 | 11/1980 | Harbaugh et al. . |
| 4,296,405 | 10/1981 | Rich . |
| 4,386,528 | 6/1983 | Engle . |
| 4,411,015 | 10/1983 | Scherl et al. . |
| 4,630,223 | 12/1986 | Schoon . |
| 4,667,248 | 5/1987 | Kanno .................. 358/452 |
| 4,694,353 | 9/1987 | Sato et al. . |
| 4,719,506 | 1/1988 | Van Buren . |
| 4,775,799 | 10/1988 | Milch et al. . |
| 4,799,080 | 1/1989 | Fujiwara .................. 355/218 |
| 4,800,287 | 1/1989 | Green, Sr. et al. . |
| 4,816,921 | 3/1989 | Akiyama et al. .................. 358/488 |
| 4,924,301 | 5/1990 | Surbrook . |
| 4,984,097 | 1/1991 | Shu . |
| 5,026,953 | 6/1991 | Hsu . |
| 5,072,382 | 12/1991 | Kamentsky . |
| 5,081,342 | 1/1992 | Knowles et al. . |
| 5,107,342 | 4/1992 | Gagnon . |
| 5,123,064 | 6/1992 | Hacker et al. . |
| 5,166,809 | 11/1992 | Surbrook . |

Primary Examiner—Scott A. Rogers
Attorney, Agent, or Firm—Albert C. Smith

[57] ABSTRACT

System and method for editing, reading, and quantizing images on an imaged side of a document without repositioning the document. The system includes an integrated edit board unit, digital scanner device, and controller. The edit unit generates an edit set of coordinate signals indicative of coordinate inputs to the edit unit. The scanner device generates a scanner set of coordinate signals corresponding to the position of the images on the document. A controller selectively alters the image, in accordance with the edit set of coordinate signals, and coordinates the two sets of coordinates received from the edit unit and the scanner device. A representation of the images on the document, including any altered image, is output from the system.

6 Claims, 3 Drawing Sheets

INTEGRATED EDIT BOARD AND DOCUMENT SCANNER

BACKGROUND OF THE INVENTION

The present invention relates generally to the field of digital imaging devices, such as copier machines having edit boards, and relates specifically to the field of digital copier machines having edit board capabilities.

Existing systems enable a document to be edited selectively by a user and then copied to reproduce a version of the document having an altered portion. Typically, these systems include a xerographic copier machine, or a digital copier machine, with a separate edit board. The edit board enables the selective editing of a document to be reproduced. In practicing that system, a user places the document to be copied face-up on the edit board. Thus viewing the document, the user then uses an electronic pen or the like to designate a geometric area to be edited in some way by the copier during its copy function.

Once the geographic area of the document is appropriately selected, the user then lifts the document off of the edit board and places the document face down on the copier surface. In this position, the surface of the document to be copied is optically or digitally scanned, and that surface is reproduced onto a separate sheet of paper.

The problem with such systems is that in moving the document from the edit board to the copier, the exact orientation of the document on the copier surface relative to its orientation on the edit board is lost. Typically, a user must replace the document to be copied on the copier surface several times before obtaining an accurately edited copy of the edited document in which the selected geographical area or areas are properly registered.

Thus, there remains a need for a system and method for selectively editing and reproducing information contained on the face of a document, with precise registration in an integrated edit board and document scanner without the user being required to reposition the document once it is in position for editing.

SUMMARY OF THE INVENTION

The present invention is a system for editing, reading, and quantizing images on an imaged side of a document without repositioning the document once it is in position for editing. The system includes an edit board apparatus integrated with a digital scanner such that a user may position a document to be edited and scanned on a single surface, without having to reposition the document between editing and scanning of the document.

The system includes an edit unit, having a sensory responsive region disposed to receive the document in a selected orientation thereon. The edit unit produces a set of coordinate signals indicative of the coordinates of sensory inputs applied thereto. Thus, when a document is positioned on the sensory responsive region of the edit unit, it is possible to indicated on the document, using a stylus pen or the like, areas to be edited. To edit the document, that document typically is positioned such that the imaged side of the document faces up, toward the user, and typically within some predetermined orientation on the edit unit. The edit unit then produces a set of signals indicative of the coordinates of the area to be edited.

The system further includes a scanner device in communication with the edit unit. The scanner device is in optical communication with the imaged side of the document such that when the document is positioned with the imaged side facing the user, the scanner is positioned above the same imaged side of the document. The scanner device reads and generates image data and a set of coordinate signals corresponding to the position of the images on the document without having repositioned the document.

A correlation element is coupled to receive both the set of coordinate signals from the edit unit and the coordinate signals from the scanner device. The correlation element selectively alters a portion of the image data associated with the correlated signals in accordance with information received by the edit unit. The altered portion of the image data then is sent to an output device, which generates a representation of the edited imaged side of the document. The representation may be in the form of stored data, that is later outputted using a printer device or the like, or may be a printer device through which the edited imaged side of the document is printed directly, for example a copier machine.

The present invention further includes a method for selectively editing and scanning images on an imaged side of a document disposed on the surface of a sensory responsive unit. The method includes a first step of positioning a document on the surface of the sensory responsive unit with the imaged side of the document facing away from the sensory response unit, i.e., facing toward the user. A second step involves supplying sensory input to the surface of the sensory responsive unit and to the document thereon for identifying coordinates of a selected portion of the images on the document.

The method further involves scanning the imaged side of the document to quantize the images on the document positioned on the sensory responsive unit to provide coordinates of the positions of the images on the document without having moved the document between the editing step and the scanning step. Thus, the coordinates corresponding to the selected portion of the imaged side of the document provided by the sensory responsive unit can be correlated with the coordinates of the images on the document. The images on the document then may be reproduced, including any altered images at the coordinates of the selected portion of the document.

DETAILED DESCRIPTION OF THE PREFERRED EMBODIMENT

The system and method of the present invention integrates digital scanner technology with edit board technology to provide a system for selectively editing and reproducing images on an imaged side of a document without moving the document from its position on the edit board to a separate position on or beneath the scanner.

Figure 1:
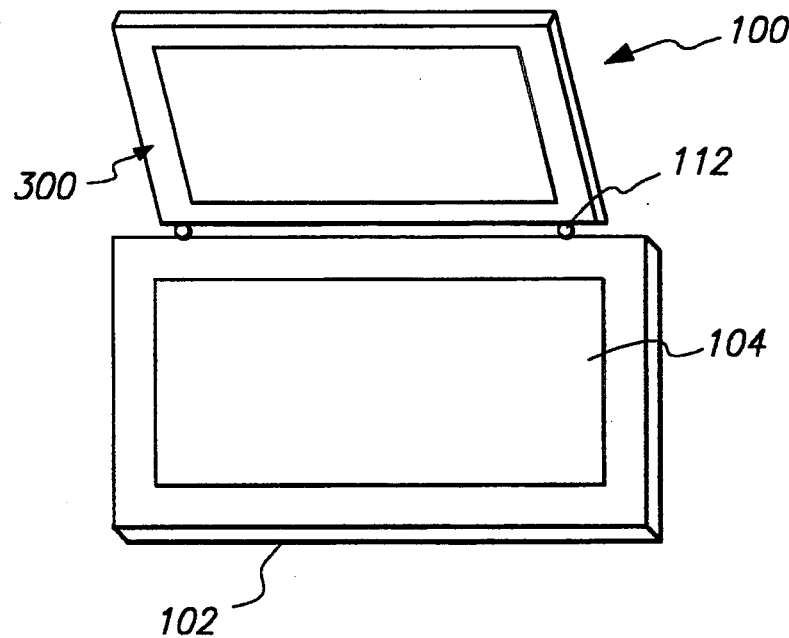
FIG. 1 is a perspective view of an embodiment of the present invention.

FIG. 1 shows an embodiment of the present system 100. The system includes an edit unit 102, having a sensory responsive region 104 upon which a document (not shown) may be positioned. The edit unit 102 may be one of any type of unit presently commercially available, such as from RICOH Corporation, San Jose, Calif. The system 100 further includes a digital scanner 300 attached to the edit unit 102 or proximate the edit unit 102 by hinge elements 112.

Figure 2:
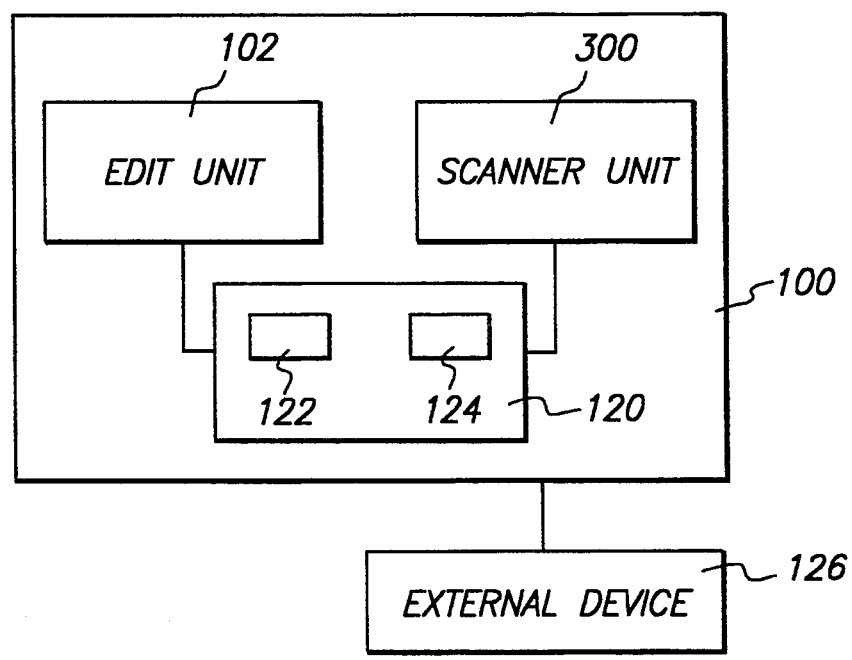
FIG. 2 is a block diagram representative of an embodiment of the present invention.

In a preferred embodiment, and as shown as a block diagram in FIG. 2, the edit unit 102 and the scanner unit 300 of the system 100 are in communication with a controller device 120. The controller device 120 may include at least one memory device 122 and a processor 124. In alternative embodiments, the controller 120 may include additional memory devices 122. Also as shown in that illustrated embodiment, an external device 126 is in communication with the system 100, and may be in direct communication with the controller device 120. The external device 126 may be a copier machine (e.g., a xerographic machine), a computer terminal, and the like.

Figure 3:
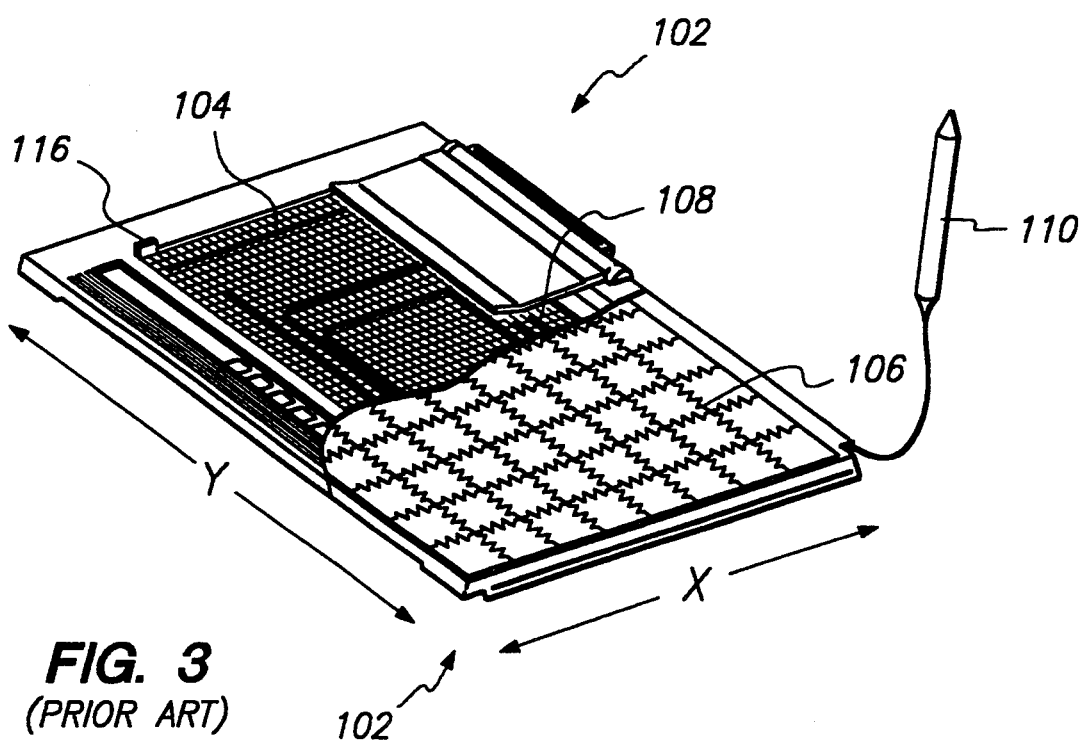
FIG. 3 is a perspective cut-away view of a conventional edit board that may be used in an embodiment of the present invention.
Figure 4:
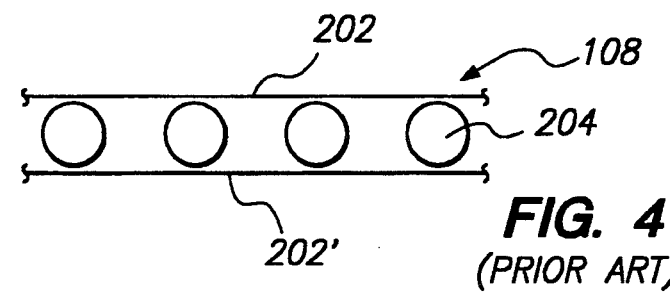
FIG. 4 is a cross-section view of a conventional positioning sheet of the exemplary edit board of FIG. 3.

One exemplary edit unit 102 is shown schematically in FIGS. 3 and 4. That unit 102 includes resistors 106 in a positioning sheet 108 of the sensory responsive unit 104 aligned along the X- and Y-axes. When part of the positioning sheet 108 is pressed with a stylus pen 110, voltage corresponding to the combination of the resistors 106 to the point of contact by the stylus pen 110 is detected. When the positioning sheet 108 is pressed with the stylus pen 110, the contact activates a switch in the stylus pen which detects the coordinate point of contact between the pen 110 and the positioning sheet 108. The upper carbon sheet 202 contacts the lower carbon sheet 202' at a coordinate point representing the contact point. The detected coordinate data may then be stored in a memory device 122 or directly transmitted to an external device 126. Typically, the detected data is representative of the coordinate position of the point of contact between the stylus pen 110 and the sensory responsive unit 104.

The sensory responsive unit 104 may include a referencing element 116, such as a raised lip on the edit unit, a physical marker on the top carbon sheet 202, or any other such element that facilitates alignment of an imaged document relative to the sensory responsive unit 104 and to the digital scanner 300 above the sensory responsive unit 104. The referencing element 116 may be used to assure that the coordinates generated by the digital scanner 300 correlate with the coordinates of the edit unit 102. The referencing element 116 may include a reference coordinate that corresponds to each device, e.g., an edit reference coordinate that corresponds to the edit unit and a scanner reference coordinate that corresponds to the scanner device. In that instance, the two reference coordinates are correlated such that the sets of coordinates generated by each device also are correlated.

FIG. 4 shows a cross-section view of a positioning sheet 108 of the exemplary edit unit 102 of FIG. 3. As shown, the positioning sheet 108 may include two overlaying carbon sheets 202, 202', one each for an X and a Y direction. Resilient insulators 204 may be positioned between the carbon sheets 202, 202' to create a separation between the sheets until they are urged into contact by a user pressing them together at selector locations using a pen or stylus 110.

Figure 5:
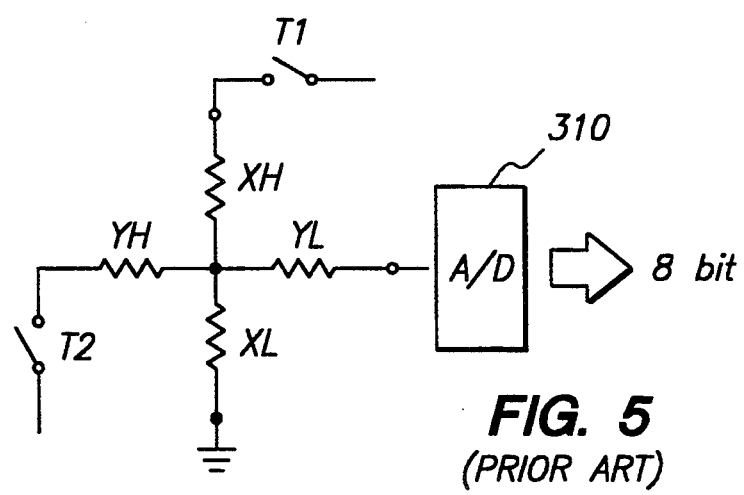
FIG. 5 is a schematic diagram of a conventional positioning sheet of the exemplary edit board of FIG. 3.

As shown in the schematic diagram of a conventional circuit at FIG. 5, voltage corresponding to the coordinate point is sent to an A/D converter 310 through the Y line as the switching transistor T1 is turned ON and the voltage is applied to the X line. At that time, the switching transistor T2 should be OFF. By changing the ON/OFF position of the switching transistors T1 and T2, the voltage of the coordinate point in the Y direction is sent to the A/D converter through the X line.

Figure 6:
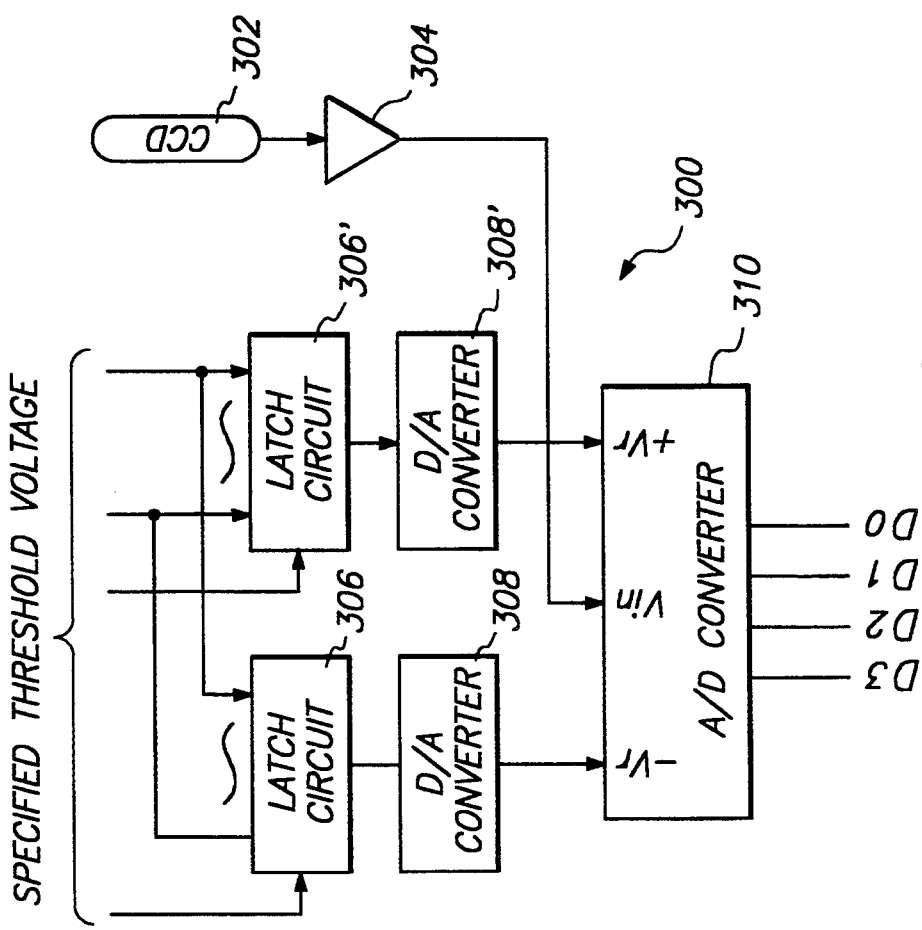
FIG. 6 is a block diagram of a conventional digital scanner device that may be used in the present system.

In a preferred embodiment, both the edit unit 102 and the digital scanner 300 are in communication with the processor 120. A conventional digital scanner that may be used in an embodiment of the present invention is shown in schematic form in FIG. 6. The illustrated scanner 300 includes a charge-coupled detector (CCD) 302 for scanning a document and converting the resulting optical signal to an analog electrical signal in a conventional manner, an amplifier 304 for amplifying the analog signal to a certain level which is easy to process, and an A/D converter 311 which coverts an amplified analog signal to a digital signal. The scanner 300 may include latch circuits 306, 306', each latching a particular threshold voltage, and digital-to-analog (DA) converters 308, 308' adapted to convert the threshold levels of their associated latch circuits 306, 306' to analog levels. Other types of digital scanners generally commercially available may be used in the present system. Such systems are commercially available from RICOH Corporation, San Jose, Calif.

The system 100 as illustrated in FIG. 1 may further include hinge elements 112 that connect the digital scanner 300 in a fixed position above the edit unit 102. The system 100 may act as a stand-alone unit or may be integrated with some external device 126. An important aspect of the present system 100 is that the digital scanner 300 is positioned above the edit unit 102 during its scanning function to assure that the imaged document is not repositioned after selective editing thereof on the sensory responsive unit 104. Of course, the digital scanner 300 also may be positioned above the edit unit 102 in a free-standing manner, using positioning marks to position the scanner 300 on the sensory responsive unit 104.

Figure 7:
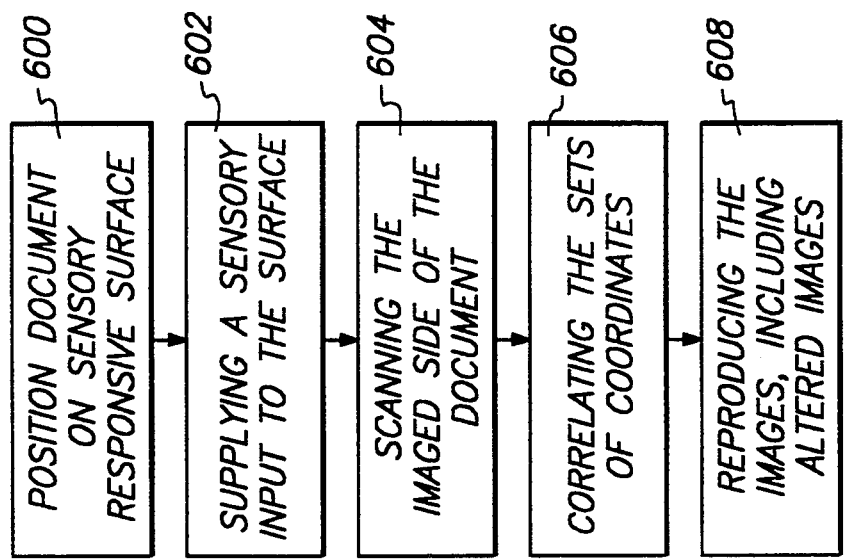
FIG. 7 is a flow chart showing an embodiment of the inventive method.

In operation of the present invention, and as shown in the flow chart of FIG. 7, a user positions 600 a document to be imaged on the sensory responsive unit 104 with the imaged side of the document facing toward the user. The user may then use a stylus pen 110 to supply 602 a sensory input to the surface of the sensory responsive unit 104 to indicate a set of coordinate points. Alternatively, the user may use any other type of sensory input to the sensory responsive unit 104 to generate the set of coordinate points. By selecting at least two coordinate points on the imaged side of the document, the user indicates an area of the imaged side of the document that is to be altered (e.g., obliterated, reduced, expanded, blacked out, colored, cross-hatched, and the like) either prior to or during the reproducing step. The set of coordinate points either may be stored in an external storage medium for subsequent retrieval, stored in the memory device 122, or sent directly to the external device 126 for controlling the area of the reproduced image in which the document alterations shall appear.

The scanner device 300 then is lowered or otherwise positioned onto the imaged side of the document, and the imaged side is scanned optically 604 to create an image data set. The image data set represents a set of coordinate signals and values of each of a plurality of picture elements at such coordinates over the area of the image on the document.

The controller device 120 receives the edit unit signals from the edit unit 102, and correlates 606 the image data set with the edit unit data set. This correlation 606 results in a set of signals representing the imaged data, including the area to be altered on the document, that is then supplied to the external device 126 to reproduce the altered image.

A separate set of signals may be generated, either at the edit unit 102, at the external device 126, or at another source, representative of the types of edits or alterations to occur within the designated region of the document. Such signals may include designation of a color, deletion of imaged data, expansion or reduction of the imaged data, and the like within the designated area, and is supplied to controller 120 which then further alters the set of signals representing the imaged data in order to incorporate the selected edits and alterations within the designated regions of the document.

What is claimed is:

1. A system for editing, reading, and quantizing images on an imaged side of a document without repositioning the document, comprising:
   A. an edit unit, including a sensory responsive region disposed to receive the document in selected orientation thereon and an edit reference coordinate, for producing an edit set of coordinate signals representative of the coordinates of sensory inputs applied thereto;
   B. a scanner device, including a scanner reference coordinate in alignment with the edit reference coordinate, for optically scanning the imaged side of the document and for generating image data and a scanner set of coordinate signals corresponding to the position of the images on the document disposed on the sensory responsive region;
   C. correlation means coupled to receive the edit set of coordinate signals and the scanner set of coordinate signals for selectively altering a portion of the image data associated with the correlated edit set and scanner set of coordinate signals and for generating altered image data; and
   D. output means coupled to receive the altered image data for generating a representation of the images on the imaged side of the document, including the altered portion of the images associated with the edit set of coordinate signals.

2. The system of claim 1, further comprising a hinge element disposed for mounting the scanner device relative to the edit unit for receiving a document therebetween.

3. The system of claim 1, further comprising a referencing element associated with the sensory responsive region for orienting the document thereon to generate the edit set of coordinate signals that are spatially representative of a selected portion of the images on the document to which sensory inputs are applied.

4. The system of claim 1, wherein the output means comprises a printer device for reproducing an altered image in response to the altered image data received thereby.

5. A method for selectively editing and scanning images on an imaged side of a document disposed on a sensory responsive surface of an edit unit without repositioning the document, the method comprising the steps of:
   A. positioning the document on the sensory responsive surface of the edit unit with the imaged side of the document facing away from the sensory responsive surface;
   B. supplying sensory input to the sensory responsive surface and to the document thereon for generating a first set of coordinates representative of a selected portion of the images on the document;
   C. scanning the imaged side of the document to quantize the images on the document positioned on the sensory responsive surface to generate a second set of coordinates representative of the images on the document without repositioning the document;
   D. correlating the first set of coordinates with the second set of coordinates;
   E. generating an altered image within the selected portion; and
   F. reproducing the images on the document from the quantized images including the altered image.

6. A method for selectively editing and scanning images on an imaged side of a document disposed on a sensory responsive surface of an edit unit without repositioning the document, the method comprising the steps of:
   A. positioning the document on the sensory responsive surface of the edit unit with the imaged side of the document facing away from the sensory responsive surface;
   B. supplying sensory input to the sensory responsive surface and to the document thereon for generating one or more sets of coordinates representative of selected portions of the images on the document;
   C. scanning the imaged side of the document to quantize the images on the document positioned on the sensory responsive surface without repositioning the document;
   D. correlating the sets of coordinates with the quantized images;
   E. generating an altered image within the selected portion determined by the sets of coordinates; and
   F. reproducing the images on the document from the quantized images including the altered image.

* * * * *